(12) United States Patent
Fink

(10) Patent No.: US 9,424,489 B2
(45) Date of Patent: *Aug. 23, 2016

(54) AUTOMATED FEATURE ANALYSIS, COMPARISON, AND ANOMALY DETECTION

(71) Applicant: CALIFORNIA INSTITUTE OF TECHNOLOGY, Pasadena, CA (US)

(72) Inventor: Wolfgang Fink, Montrose, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/811,752

(22) Filed: Jul. 28, 2015

(65) Prior Publication Data

US 2015/0332125 A1 Nov. 19, 2015

Related U.S. Application Data

(63) Continuation of application No. 14/077,134, filed on Nov. 11, 2013, now Pat. No. 9,122,956.

(60) Provisional application No. 61/724,813, filed on Nov. 9, 2012.

(51) Int. Cl.
*G06K 9/62* (2006.01)
*G06K 9/42* (2006.01)

(52) U.S. Cl.
CPC ........... *G06K 9/6232* (2013.01); *G06K 9/6218* (2013.01); *G06K 9/6247* (2013.01); *G06K 9/6298* (2013.01); *G06K 9/42* (2013.01)

(58) Field of Classification Search
None
See application file for complete search history.

(56) References Cited

U.S. PATENT DOCUMENTS

| 5,598,510 | A  | * | 1/1997 | Castelaz | G06K 9/627 |
| | | | | | 382/157 |
| 6,888,965 | B1 | * | 5/2005 | Rath | G06F 17/18 |
| | | | | | 382/173 |

OTHER PUBLICATIONS

Fink et al. ("Automated Global Feature Analyzer—A Driver for Tier-Scalable Reconnaissance", 2008, IEEE publication, pp. 2 Abstract pages, and pp. 1-12 of the article (14 pages total)).*
Fink W, Hilmers DC, Tarbell MA (2014) Portable System to Monitor Astronaut Ocular Health and the Development of the VIIP Syndrome; IEEE Aerospace Conference Proceedings, paper #2657, Big Sky, Montana.

* cited by examiner

*Primary Examiner* — Brian P Werner
(74) *Attorney, Agent, or Firm* — Steinfl & Bruno LLP

(57) ABSTRACT

Novel methods and systems for automated data analysis are disclosed. Data can be automatically analyzed to determine features in different applications, such as visual field analysis and comparisons. Anomalies between groups of objects may be detected through clustering of objects.

34 Claims, 4 Drawing Sheets

AUTOMATED FEATURE ANALYSIS, COMPARISON, AND ANOMALY DETECTION

CROSS REFERENCE TO RELATED APPLICATIONS

The present application is a continuation of U.S. application Ser. No. 14/077,134 which in turn claims priority to U.S. Provisional Patent Application No. 61/724,813, filed on Nov. 9, 2012, the entire disclosure all of which is incorporated herein by reference in their entirety.

STATEMENT OF INTEREST

This invention was made with government support under Grant No. W81XWH-09-1-0266 awarded by the US Army Medical Research and Material Command. The government has certain rights in the invention.

TECHNICAL FIELD

The present disclosure relates to automated data analysis. More particularly, it relates to systems, devices and methods for automated feature analysis, comparison and anomaly detection.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
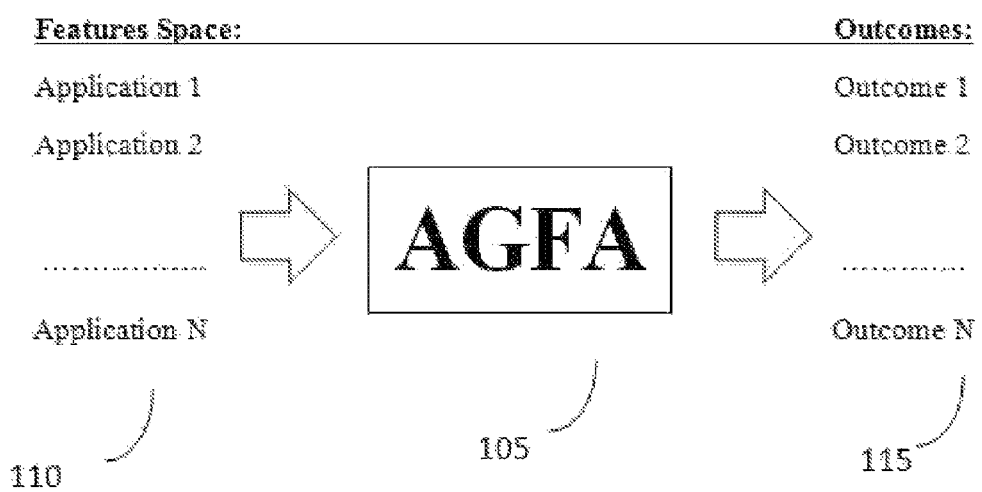
FIG. 1 illustrates a general workflow for AGFA.

In a first aspect of the disclosure, a computer implemented method is described, the computer implemented method comprising: providing a sensing and analyzing device, the sensing and analyzing device comprising at least one sensor configured to detect at least one physical feature describing a plurality of physical objects; generating, by the sensing and analyzing device, a plurality of feature vectors representing the plurality of objects, based on the at least one physical feature, wherein the plurality of feature vectors comprises a plurality of components describing the at least one physical feature, wherein each component of the plurality of components has a numerical range, wherein the at least one physical feature is represented by at least one component within each feature vector; converting, by the sensing and analyzing device, the numerical range of each component to a range between 0 and 1, wherein the converting is carried out by formula $$F1_{ij} = \frac{OrigF_{ij} - MinF_j}{MaxF_j - MinF_j}$$

where $F1_{ij}$ is a normalized value of $i^{th}$ object and $j^{th}$ feature component, $OrigF_{ij}$ is an original $j^{th}$ feature component value of $i^{th}$ object, $MinF_j$ and $MaxF_j$ are a minimum value and a maximum value of $j^{th}$ feature component, thereby obtaining a first plurality of normalized feature vectors comprising a first plurality of normalized components and further comprising a total number of components for the at least one physical feature of each first normalized feature vector of the first plurality of normalized feature vectors; for each first normalized feature vector of the first plurality of feature vectors, dividing, by the sensing and analyzing device, the plurality of normalized components for each physical feature of each first normalized feature vector by the total number of components for each physical feature of the first normalized feature vector, thereby obtaining a second plurality of normalized feature vectors; normalizing, by the sensing and analyzing device, the second plurality of normalized feature vectors by formula $$F3_{ij} = \frac{F2_{ij}}{\sqrt{\sum_{j=1}^{N}(F2_{ij})^2}}$$

where $F2_{ij}$ is a component of a feature vector of the second plurality of normalized feature vectors, and $F3_{ij}$ is a resultant component for each feature vector of a third plurality of normalized feature vectors; clustering, by the sensing and analyzing device, the third plurality of normalized feature vectors, thereby obtaining a plurality of clustered normalized feature vectors; analyzing, by the sensing and analyzing device, the plurality of physical objects, based on at least one of the first, second, or third plurality of normalized feature vectors.

In a second aspect of the disclosure, a computer implemented method is described, the computer implemented method comprising: providing a sensing and analyzing device, the sensing and analyzing device comprising at least one sensor configured to detect at least one physical feature describing a plurality of physical objects; generating, by the sensing and analyzing device, a plurality of feature vectors representing the plurality of objects, based on the at least one physical feature, wherein the plurality of feature vectors comprises a plurality of components describing the at least one physical feature, wherein each component of the plurality of components has a numerical range, wherein the at least one physical feature is represented by at least one component within each feature vector; clustering, by the sensing and analyzing device, the plurality of feature vectors, thereby obtaining a plurality of clustered feature vectors; applying, by the sensing and analyzing device, principal component analysis to the plurality of clustered feature vectors, thereby obtaining a distance flag value and a first evaluated plurality of feature vectors; calculating, by the sensing and analyzing device, a number flag value by counting each feature vector of the plurality of clustered feature vectors, based on a threshold value, thereby obtaining a second evaluated plurality of feature vectors; analyzing, by the sensing and analyzing device, the plurality of physical objects, based on the first or second evaluated plurality of feature vectors.

In a third aspect of the disclosure, a computer implemented method is described, the computer implemented method comprising: providing a sensing and analyzing device, the sensing and analyzing device comprising at least one sensor configured to detect at least one physical feature describing a plurality of physical objects; generating, by the sensing and analyzing device, a plurality of feature vectors representing the plurality of objects, based on the at least one physical feature, wherein the plurality of feature vectors comprises a plurality of components describing the at least one physical feature, wherein each component of the plurality of components has a numerical range, wherein the at least one physical feature is represented by at least one component within each feature vector; clustering, by the sensing and analyzing device, the plurality of feature vectors, thereby obtaining a plurality of clustered feature vectors; applying, by the sensing and analyzing device, distance calculation based on a threshold value to the plurality of clustered feature vectors, thereby obtaining a distance flag value and a first evaluated plurality of feature vectors; calculating, by the sensing and analyzing device, a number flag value by counting each feature vector of the plurality of clustered feature vectors, based on a threshold value, thereby obtaining a second evaluated plurality of feature vectors; analyzing, by the sensing and analyzing device, the plurality of physical objects, based on the first or second evaluated plurality of feature vectors.

In a fourth aspect of the disclosure, a computer implemented method is described, the computer implemented method comprising: providing a sensing and analyzing device, the sensing and analyzing device comprising at least one sensor configured to detect at least one physical feature describing a plurality of physical objects; generating, by the sensing and analyzing device, a plurality of feature vectors representing the plurality of objects, based on the plurality of physical features, wherein the plurality of feature vectors comprises a plurality of components describing the plurality of physical features, wherein each component of the plurality of components has a numerical range, wherein each physical feature of the at least one physical feature is represented by at least one component within each feature vector; converting, by the sensing and analyzing device, the numerical range of each component to a range between 0 and 1, wherein the converting is carried out by formula $$F1_{ij} = \frac{OrigF_{ij} - MinF_j}{MaxF_j - MinF_j}$$

where $F1_{ij}$ is a normalized value of $i^{th}$ object and $j^{th}$ feature component, $OrigF_{ij}$ is an original $j^{th}$ feature component value of $i^{th}$ object, $MinF_j$ and $MaxF_j$ are a minimum value and a maximum value of $j^{th}$ feature component, thereby obtaining a first plurality of normalized feature vectors comprising a first plurality of normalized components and further comprising a total number of components for the at least one physical feature of each first normalized feature vector of the first plurality of normalized feature vectors; for each first normalized feature vector of the first plurality of feature vectors, dividing, by the sensing and analyzing device, the plurality of normalized components for the at least one physical feature of each first normalized feature vector by the total number of components for each physical feature of the first normalized feature vector, thereby obtaining a second plurality of normalized feature vectors; normalizing, by the sensing and analyzing device, the second plurality of normalized feature vectors by formula $$F3_{ij} = \frac{F2_{ij}}{\sqrt{\sum_{j=1}^{N}(F2_{ij})^2}}$$

where $F2_{ij}$ is a component of a feature vector of the second plurality of normalized feature vectors, and $F3_{ij}$ is a resultant component for each feature vector of a third plurality of normalized feature vectors; clustering, by the sensing and analyzing device, the third plurality of normalized feature vectors, thereby obtaining a plurality of clustered normalized feature vectors; applying, by the sensing and analyzing device, principal component analysis to the plurality of clustered normalized feature vectors, thereby obtaining a distance flag value and a first evaluated plurality of normalized feature vectors; calculating, by the sensing and analyzing device, a number flag value by counting each feature vector of the plurality of clustered normalized feature vectors, based on a threshold value, thereby obtaining a second evaluated plurality of normalized feature vectors; analyzing, by the sensing and analyzing device, the plurality of physical objects, based on the first or second evaluated plurality of normalized feature vectors.

DETAILED DESCRIPTION

The present disclosure relates to automated data analysis that can apply data aggregation and extraction of features from a wide variety of application fields. A similar technique for the extraction of features from a set of data may be applied to different sets of data. For example, a geological survey may collect data about a region of Earth, or Mars. Data collected may comprise visual images, x-ray images, mass spectroscopy, chemical samples, and so on. In the present disclosure, methods are described to aggregate such data in a feature space, define mathematical entities which describe them, extract features from the data, and output a resulting analysis. For example, certain visual features may indicate the presence of a certain mineral, while x-ray images or hyperspectral images may give a different chance for the presence of that mineral. In such cases, human intervention may normally be necessary to determine the relative importance and reliability of each set of data, such as visual vs x-ray images. In the present disclosure, mathematical entities, that is feature vectors, are used to express the information contained in different sets of data (e.g., visual and x-ray images) in a format (the feature vectors) which allows automated comparative analysis. The automated systems, devices or methods of the present disclosure may therefore perform an automated analysis of the features of different sets of data. Similar methods may be used for other applications, for example medical diagnosis, financial systems and military reconnaissance. Therefore, such methods, devices or systems may be termed automated global feature analyzer (AGFA).

For every application, AGFA can extract and deliver features that make up a feature vector. Once feature vectors are generated, the AGFA framework can then operate. As a result, AGFA can cluster the data, and can find anomalies based on the feature space. In other words, the data is transformed in a feature space and can then be analyzed in that space. Through this transformation, automatic analysis of the data is possible regardless of the origin of the data. Furthermore, AGFA can also allow for objects to be compared to one another based on their respective feature vectors. In some embodiments, a temporal change analysis may also be carried out, by analyzing the difference between feature vectors at different times. For example, the same feature vector may be compared with itself at time 1 and time 2.

FIG. 1 illustrates how AGFA (105) can be applied to a variety of applications in feature space (110), and can give an outcome (115) for each application (110).

For example, regarding applications for geology, mining, resource allocation, and (military) reconnaissance, the features space will contain feature vectors consisting of specific features. In some embodiments, a list of features to be included in a feature vector may comprise: Color; Albedo (brightness); Ellipse fit of circumference of segmented object, yielding semi-major and semi-minor axes, the ratio of which can be a measure of how circular an object is; Extent; Angularity; Compactness; Size; Gabor filters for texture assessment; Multi-spectral data; Hyperspectral data; Spectroscopic data; Biological contaminate concentrations; Chemical contaminate concentrations; Radioactive contamination.

Some possible outcomes after application of AGFA to the above features may comprise: Region-of-interest demarcation/delineation; Anomaly detection; Autonomous vehicle control; Guidance for exploration equipment. In some embodiments, the methods of the present disclosure may be applied to asteroid exploitation.

As another example, for medical diagnosis, possible features may comprise: Patient-specific data, such as: age, height, weight, gender; Blood examination results; Urine/stool examination results; X-ray, CT, MRI, fMRI, Ultrasound images/results; Multi-spectral data; Hyperspectral data; Pulse; Heart rate; Intraocular pressure; Intracranial pressure; Blood pressure; Lung volume.

Some possible outcomes after application of AGFA to the above features may comprise: Medical diagnosis; Guidance of surgical equipment (e.g., laparoscopic surgeries); Region-of-interest demarcation/delineation for tumor treatment; Anomaly detection.

As another example, for financial markets, possible features may comprise: Stock values; Opening bid; Closing bid; Bids throughout trading period; Gold price; Stock indices (Dow Jones, S&P 500, etc.); Trading volume (e.g., # of stocks).

Some possible outcomes after application of AGFA to the above features may comprise: Buy/Hold/Sell decisions; Anomaly detection in trends.

Another example for the application of AGFA is visual fields. In certain situations, medical diagnosis of visual field defects in a human eye may be done on a mass scale (e.g., thousands to millions of people worldwide), or it may be only done remotely, for example, in remote locations on Earth, or, for the case of astronauts, on a space mission to Mars, or for human settlement on the Moon.

In such cases, an automated system for the detection of visual field defects may be advantageous. In such situations, in the absence of clinical experts, an integrated auto-characterization system can analyze 3D Computerized Threshold Amsler Grid (3D-CTAG) visual field data and objectively identify and characterize the occurring visual field defects (e.g., scotomas, as in missing areas of vision) in accordance with the following numerical methods: (1) visual field data transforms include area and volume of visual field loss, lost and preserved area grades, and slope distribution; and (2) scotoma data transforms include scotoma perimeter/scallopedness and scotoma center location. As it is known to the person skilled in the art, the Amsler test is a visual field test. The AGFA framework may also be equally applicable to other visual field test data, e.g., to Humphrey Visual Field Analyzer.

Visual Field Data Transforms
Area of Visual Field Loss Calculation Per Contrast Level The raw 3D-CTAG data can be systematically assessed, first for the number n of distinct contrast sensitivity levels present in the data, then for the area (denoted $A_i$, where $0\% \leq i \leq 100\%$ represents the percent contrast level) in number of square degrees (e.g., grid points) and percentage of visual field lost, $$\left(\frac{A_i}{tested\ area}\right),$$

at each contrast level. The percentages and areas thus document the visual field loss as a function of contrast sensitivity, with the topmost level (100) indicating intact vision at the lowest contrast presented.

Calculation of Lost and Preserved Area Grades:

The Lost Area Grade (LAG) is calculated by dividing the scotoma area at the highest tested contrast level ($A_h$) by the scotoma area at the lowest tested contrast level ($A_{100}$). This area ratio is then multiplied by the contrast sensitivity scaling factor, which consists of the scotoma depth (100−h) divided by the total depth (100), then squared, to eliminate degeneracy:

$$\left(\frac{(100-h)}{100}\right)^2.$$

The complete measure is thus $$\left(\frac{A_h}{A_{100}}\right) * \left(\frac{(100-h)}{100}\right)^2.$$

The Preserved Area Grade (PAG) is calculated by dividing the preserved visual field area at the lowest tested contrast level ($A_{100}$) by the preserved visual field area at the highest tested contrast level ($A_h$), then multiplying by the contrast sensitivity scaling factor as above:

$$\left(\frac{A_{100}}{A_h}\right) * \left(\frac{(100-h)}{100}\right)^2.$$

Degeneracy in these two measures (i.e., LAG and PAG) can occur if the contrast sensitivity scaling factor is not squared: for example, a shallow scotoma may have such a large area ratio that its LAG and PAG match the LAG and PAG of a steep scotoma with a sufficiently small area ratio.

Volume Calculation of Visual Field Loss:

The number of data points at each level of contrast sensitivity less than 100 is multiplied by the loss in contrast sensitivity at each data point to determine the volume of visual field loss ($\Sigma_{(i)} A_i (100-i)$). The volume of visual field loss is then divided by total tested visual field volume to determine the percentage of visual field volume lost.

Slope Grades of Visual Field Loss (and Histogram of Slope Grades):

The slope grades are independently determined in, for example, both the horizontal (x) and vertical (y) directions.

A slope grade is defined as the loss of contrast sensitivity (e.g., 100−i) divided by the number of degrees (Δx or Δy) over which the loss occurs:

$$\frac{100-i}{\Delta x}$$

for horizontal slope grade and $$\frac{100-i}{\Delta y}$$

for vertical slope grade. The slope histogram depicts the distribution of slope grades in either vertical or horizontal direction. Radial slope grades, calculated from the center of a scotoma, can be treated in the same fashion.

Scotoma Data Transforms

Scotoma Center

The x-values and y-values of all scotoma data points for each tested contrast sensitivity level are averaged to obtain the coordinates for the scotoma center at each tested contrast sensitivity level. The respective centers are plotted in 3D together with the data points of the entire visual field. The centers are subsequently averaged to obtain the mean center. Then, the mean distance and standard deviation of distances from each center to the mean center are calculated. All centers and the mean center for each scotoma are then plotted onto a scatterplot.

Scotoma Perimeter

The scotoma perimeter points at each tested contrast sensitivity level are determined and recorded by scanning the list of points in a scotoma for points that are horizontally and/or vertically adjacent to non-scotoma points at the respective level (i.e., with contrast sensitivity levels greater than that of the current level).

Scallopedness

The scallopedness measure assesses the scotoma perimeters at each contrast sensitivity level for the fluctuation of curvature. All points on the perimeter are sequentially numbered. Starting with the first point (p=1), the Euclidian distance is calculated between each point along the perimeter (p) and the point that is a user-defined index offset (x) down the list (p+x) of perimeter points. All Euclidian distances are averaged and subsequently displayed as a histogram. The procedure is performed at each contrast sensitivity level with, for example, two different user-defined index offsets. A sharply peaked histogram (i.e., one peak) indicates a scotoma with a smooth perimeter (not scalloped); peaks towards the left end of the histogram indicate more tightly curved perimeters (i.e., small radius of curvature), while peaks towards the right end of the histogram indicate perimeters with a large radius of curvature.

General Set of Indices Also Accounting for Metamorphopsia

To also account for the phenomenon of metamorphopsia (i.e., distortion or waviness of straight Amsler grid lines instead of missing ones) a more general superset of algorithms can be implemented for the automated characterization of both distorted vision (i.e., metamorphopsia) and visual field defects (i.e., scotomas) in 3D. The following objective characterization indices that describe visual field defects can be used:

Absolute # of Test-Locations Not Seen: Numerical count of Amsler grid points not seen regardless of contrast.

Relative # of Test-Locations Not Seen: Absolute number of test locations not seen divided by total number of available test-locations in percent regardless of contrast.

Area of Visual Field Impaired at XX % Contrast: number of Amsler grid points marked as not visible at a given Amsler grid contrast;

Relative Area of Visual Field Impaired at XX % Contrast: number of Amsler grid points marked as not visible at a given Amsler grid contrast divided by the total number of available test-locations at that given Amsler grid contrast in [percent];

Absolute Hill-of-Vision "Volume" Lost: Sum of areas of visual field not seen multiplied by respective, tested contrast levels (in %) measured in [deg$^2$ percent].

Relative Hill-of-Vision "Volume" Lost: Absolute Volume Lost divided by overall tested Hill-of-Vision measured in [percent].

Lost Area Grade (LAG): Existing scotoma area at highest tested contrast level divided by existing scotoma area at lowest tested contrast level multiplied by the actual scotoma depth measured in [percent] contrast.

Preserved Area Grade (PAG): Existing preserved visual field area at lowest tested contrast level divided by existing preserved visual field area at highest tested contrast level multiplied by the actual scotoma depth measured in [percent] contrast.

Inverse Lost Area Grade (ILAG): existing scotoma area at lowest tested contrast level divided by existing scotoma area at highest tested contrast level multiplied by the actual scotoma depth measured in [percent] contrast.

Inverse Preserved Area Grade (IPAG): existing preserved visual field area at highest tested contrast level divided by existing preserved visual field area at lowest tested contrast level multiplied by the actual scotoma depth measured in [percent] contrast.

The above characterization indices enable the qualitative and quantitative analysis of temporal changes of a subject's visual field. There are modified embodiments of the above listed indices and additional indices known to the person skilled in the art.

In the following, different characteristics of AGFA will be described, using the example of visual field test. The person skilled in the art will understand that while the AGFA methods are described with a specific example, different applications can be envisioned.

In some embodiments, AGFA may comprise a step of Flag Computation. The Flag Computation step may comprise Feature Vector Normalization Procedures.

Feature Vector Normalization Procedures

AGFA can be used to analyze objects. An object may be, for example, a visual field data set, a rock in an image, etc. Each object may have a feature (component) vector assigned with all the feature component values. In other words, a feature vector may comprise different components, each component having a specific value. The feature component values may have different ranges (in terms of the maximum and minimum values). Moreover, the feature components may have discrete or continuous values. In order to compare the objects in an image, it may be necessary to normalize them so as to make the feature component value independent of range and number of components in a feature.

In other words, an object can be assigned a feature vector. The feature vector may comprise different components. Each component may have a certain range, different from other components. In order to compare feature vectors, it may be advantageous to normalize the range of each component to make it possible to compare feature vectors.

For instance, it is not possible to compare two objects based on two features such as color (R, G, B components each with integer value range [0,255]) and angularity (with only one component and real value range [0,1]). In this example, the color feature has three times the number of components, as compared to the angularity feature. Therefore, if a weight would be assigned based on the number of components, the color feature would have three times the weight of the angularity feature. Further, each color component would have a range [0,255] compared to [0,1] for the angularity feature. Therefore, the color components may contribute 255 times more weight than angularity. To overcome this issue, a three-stage normalization procedure can be implemented, in order to normalize each component to a range [0,1]. This normalization procedure also renders the comparison independent of the number of components in a feature.

In some embodiments, in the first step of normalization, referred to as Min–Max normalization, the feature component values are converted to within a real value range [0,1] using the formula:

$$F1_{ij} = \frac{OrigF_{ij} - MinF_j}{MaxF_j - MinF_j}$$

where $F1_{ij}$ is the Min-Max normalized value of $i^{th}$ object and $j^{th}$ feature component, $OrigF_{ij}$ is the original $j^{th}$ feature component value of $i^{th}$ object, $MinF_j$ and $MaxF_j$ are the minimum value and the maximum value of $j^{th}$ feature component. The minimum and the maximum value for each feature component may be the theoretical range for that feature within a model, for example, [0,255] for a RGB color. In other embodiments, the minimum and maximum value may be a specific subset range of the theoretical range, for example [20,120] for a RGB color in a specific collection of objects where the values below 20 or above 120 are absent. In yet other embodiments, the minimum and maximum values may be user-defined.

In the second step of normalization, which can also be termed feature-dimension normalization, each feature component value can be divided by the number of components in that feature by the formula:

$$F2_{ij} = \frac{F1_{ij}}{N_j}$$

where $F2_{ij}$ is the feature-dimension normalized value of $i^{th}$ object and $j^{th}$ feature component and $N_j$ is the number of dimensions of $j^{th}$ feature.

In the third step of normalization, which may also be termed absolute normalization, the following formula is applied:

$$F3_{ij} = \frac{F2_{ij}}{\sqrt{\sum_{j=1}^{N} (F2_{ij})^2}}$$

The above three normalization steps ensure that the feature values are in the real value range [0,1] and are independent of the number of components. This ensures that each feature component value contributes equally in analyzing the features of an object, for example to determine whether an object is anomalous.

After Feature Vector Normalization Procedures, the Flag Computation step may comprise Sequential Clustering.

Sequential Clustering

In some embodiments, the feature component vector obtained in the previous step can characterize an object in an image. A next possible step towards determining if an object or objects is or are anomalous is to classify the objects into different groups. In one embodiment, a sequential clustering method can be implemented, which groups the incoming vectors into a natural number of clusters in real time. A possible advantage of this method over other clustering methods, like K-means clustering, is that the number of clusters the vectors are to be grouped into does not need to be provided. The method not only clusters the vectors but also determines the natural number of clusters.

There are other (supervised or unsupervised) clustering methods which could be used, e.g. Level-Set-Analysis. Such algorithms determine automatically the natural number of clusters from the data itself and are known to the person skilled in the art.

As known to the person skilled in the art, the basic sequential clustering method comprises a single threshold, with the vectors having a distance with cluster centers below the threshold being grouped into a particular cluster, essentially clustering all vectors in one pass. In some embodiments, the sequential clustering method implemented in the present disclosure differs from the basic method in the sense that there are two thresholds and the number of passes to cluster all vectors could be more than one.

In the basic form of sequential clustering, the first incoming vector is binned into the first cluster, which also becomes its center. The next incoming vector is binned to one of the existing clusters if the distance between the vectors to a particular cluster center is below a pre-defined threshold, and if not, the vector is binned into a new cluster. A possible drawback of this method is that the formation of clusters and cluster members depend on the order in which the vectors arrive since all the vectors are clustered in one pass. Another possible drawback is that the choice of threshold influences the results, i.e., changing the threshold value yields a different number of clusters or same number of clusters with different members.

In some embodiments of the present disclosure, a different method is implemented, which considers the Euclidean distance when calculating the distance between a vector and a cluster center. This constitutes an improved version of the standard sequential clustering method. In the present disclosure, this improved method may be referred to as certainty sequential clustering.

In certainty sequential clustering, two thresholds $t_1$ and $t_2$ ($t_2 > t_1$) are selected such that if the Euclidean distance between a vector, $F3_i$ and nearest cluster center, $C_j$, $d(F3_i, C_j)$ is below $t_1$, the vector belongs to the corresponding cluster. If $d(F3_i, C_j)$ is above $t_2$, then vector $F3_i$, does not belong to cluster $C_j$. However, if $t_1 < d(F3_i, C_j) < t_2$, vector $F3_i$ is not certain to belong to $C_j$ and its binning is postponed. Introduction of two thresholds overcomes the difficulty of choosing the value of only one threshold that best reflects the data. Also, postponing the classification of a vector in case of uncertainty leads to multiple passes and overcomes possible drawbacks due to the order of incoming data or vectors. Certainty sequential clustering is described, for example, in Trahanias P et al., *An efficient sequential clustering method*, Pattern recognition 22:449-53, 1989, the disclosure of which is incorporated herein by reference in its entirety.

In other embodiments, K-means clustering can also be used, however it requires the number of clusters to be provided beforehand unlike sequential clustering.

After Sequential Clustering, the Flag Computation step may comprise Principal Component Analysis.

Principal Component Analysis

The clustering of feature component vectors explained in the previous section can give information about any objects being anomalous from other objects detected in an image or data set. The anomaly could be any one of the features or a set or combination of features (e.g., "fingerprint"). However, the method may not necessarily be able to determine whether the anomaly is really of interest for further study.

Figure 2:
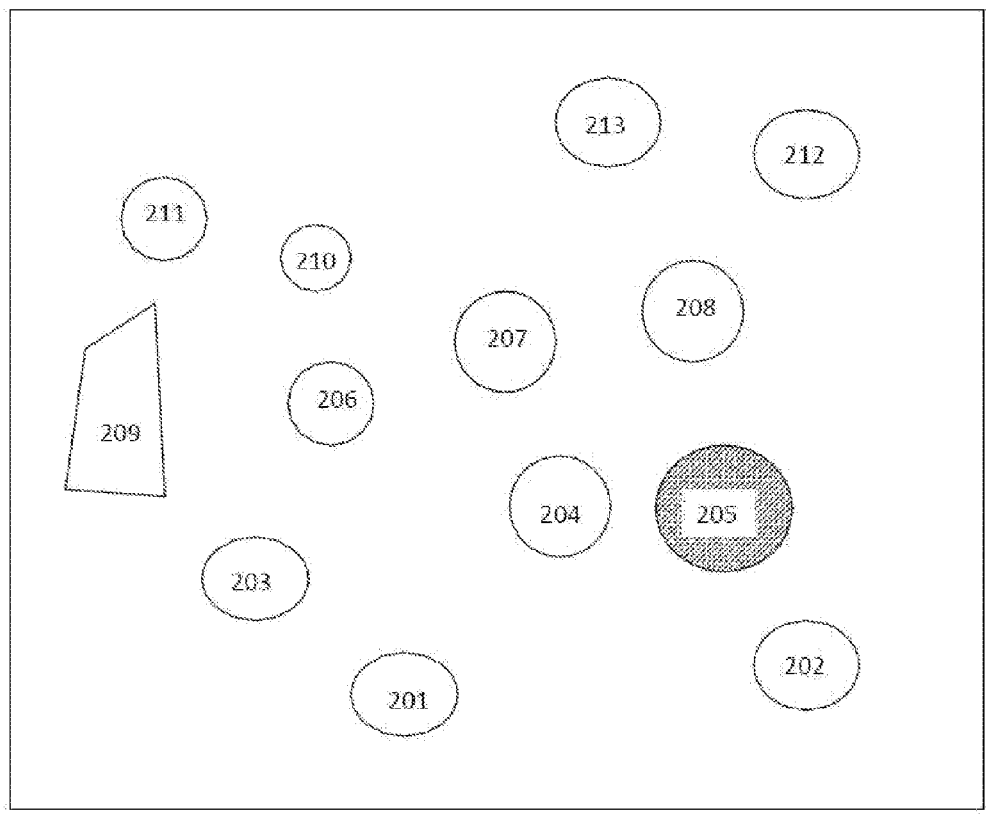
FIG. 2 illustrates a collection of geometric shapes as a schematic example of clustering.

FIG. 2 illustrates a collection of geometric shapes as a schematic example of clustering. In FIG. 2, each geometric shape represents one object. The objects (201, 202, 203, 204, 206, 207, 208, 210, 211, 212, 213) in FIG. 2 can be clustered together as they have similar shape, except for object number (205), which has a shape similar to the other objects (201, 202, 203, 204, 206, 207, 208, 210, 211, 212, 213) but has a different pattern or texture, and object number (209) which has a different shape from the other objects (201, 202, 203, 204, 206, 207, 208, 210, 211, 212, 213). Therefore, two objects (205, 209) should not be clustered with the remaining objects (201, 202, 203, 204, 206, 207, 208, 210, 211, 212, 213). The two objects (205, 209) are anomalous and should be clustered on their own. From human visual inspection of FIG. 2, it is possible to understand that objects (205, 209) have a different shape or pattern or texture. However, the automatic clustering method, without human visual inspection, does not specify to what extent the anomaly is a "true" anomaly as far as significance is concerned. In other words, if the pattern or texture anomaly of object (205) or the shape anomaly of object (209) is really of any significance for further study, and if so to what extent. Therefore, the significance of anomalies may not be quantified from the clustering step alone. Such quantification of the significance of the anomaly can be carried out through the principal component analysis step. In other examples, other differences may be present, such as color instead of pattern or textures.

Principal component analysis (PCA) can be defined as an orthogonal linear transformation that transforms the data to a new coordinate system such that the greatest variance by any projection of the data comes to lie on the first coordinate (called the first principal component), the second greatest variance on the second principal component, and so on. Such method is known to the person skilled in the art, and is described, for example, in Jolliffe I. T., *Principal component analysis*, Wiley Online Library, 2002, the disclosure of which is incorporated herein by reference in its entirety.

The number of principal components is no higher than the number of variables or vectors. The idea is to determine the first principal component of each cluster, which can indicate the greatest variance for the constituting component or components of the feature vectors along direction of that component or these components in the feature vector space.

The clustering of objects in FIG. 2 is detailed in Table 1.

TABLE 1

The clusters obtained using certainty sequential clustering and corresponding members for the feature component vectors of objects in FIG. 2. The threshold values used are $t_1 = 0.15$ and $t_2 = 0.17$.

| Cluster Number | Object numbers belonging to Cluster |
|---|---|
| 1 | 201, 202, 203, 204, 206, 207, 208, 210, 211, 212, 213 |
| 2 | 205 |
| 3 | 209 |

In the example of objects in FIG. 2, the aim is to determine the first principal component of each cluster. The number of feature component values N becomes the dimension of a feature component vector. If F is an M×N matrix where M is the number of feature component vectors in a cluster and each vector forms one row of a matrix, then a typical method used to evaluate the principal components is to decompose the covariance matrix of F to determine its eigenvalues and eigenvectors. An example of this procedure can be found, for example, in Press et al., *Numerical Recipes in C*, Cambridge University Press, 1992, the disclosure of which is incorporated herein by reference in its entirety. The eigenvectors are unit vectors along the principal components and the eigenvalues are their corresponding magnitude. Single value decomposition can be used to determine the eigenvectors and eigenvalues using the formula:

$$CovF = U*D*V'$$

where CovF is a N×N covariance matrix of matrix F, U is a N×N unitary matrix of eigenvectors of matrix CovF, D is a N×M rectangular diagonal matrix with the N diagonal values being the eigenvalues, and V' is a M×N unitary matrix.

The largest eigenvalue is the magnitude of the first principal component of a cluster, which, in other words, quantifies the direction with maximum variance of the vectors within that cluster. The eigenvalue is the length of the eigenvector, where the eigenvector gives the direction of maximum variance of the principal component of a cluster. For example, Table 2 gives the largest eigenvalue for the clusters of Table 1 and FIG. 2.

TABLE 2

The largest eigenvalues of each of the clusters determined using certainty sequential clustering in Table 1.

| Cluster number | Largest Eigen value |
|---|---|
| 1 | 0.397814 |
| 2 | 0.000000 |
| 3 | 0.000000 |

To determine if two clusters are disjoint, a comparison can be made for the Euclidian distance in feature space between the centers of the clusters, with that of the sum of the largest eigenvalues of each cluster. If the Euclidian distance is smaller than the sum, then the two clusters overlap, if not, then the two clusters are disjoint in feature space. In another embodiment, the corresponding eigenvectors belonging to the respective eigenvalues can be projected onto the respective distance vector between two clusters to get a more accurate distance measurement. If two clusters are disjoint, i.e., the Euclidian distance is smaller than the sum of the largest eigenvalues, it is likely that the objects belonging to one of the clusters are significantly different from the objects belonging to the other cluster with respect to their features. If the clusters overlap, then there is no anomaly. This property can be quantified by a distance flag; if the clusters are disjoint the distance flag can be set as red (numerically, e.g., a value of 1) and if the clusters overlap the distance flag can be set as green (numerically, e.g., a value of 0). Continuing with the example of Tables 1 and 2, Table 3 gives the distance flag value for the pairwise relation among the three clusters of Table 2. It can be seen from Table 3 that all clusters are disjoint respectively, as their distance flag has a value of 1. The person skilled in the art will understand that different values may be used to indicate that clusters are disjoint. For example, in some embodiments the distance flag may be set as 0 to indicate disjoint clusters, or, in yet another embodiment, the distance flag can take on continuous values, e.g., between 0 and 1, proportional to the degree of overlap or separation. In some embodiments, a different type of distance may be employed, instead of an Euclidian distance.

TABLE 3

The distance flag between a pair of clusters determined using certainty sequential clustering in Table 1.

| Cluster number | Cluster number | Distance flag |
|---|---|---|
| 1 | 2 | 1 |
| 1 | 3 | 1 |
| 2 | 3 | 1 |

Whether a cluster is anomalous cannot necessarily be determined from the distance flag alone. It can be assumed that the cluster with lesser number of objects is anomalous and this property can be represented by a number flag. For example, if the number of objects in a cluster is less than ten percent (e.g., user-defined threshold) of the number of objects in the other cluster, the number flag can be set as red (numerically, e.g., a value of 1), otherwise the number flag can be set as green (numerically, e.g., a value of 0). Continuing from the example of Table 3, the result of this step is detailed in Table 4. From Table 4, it can be seen that the number flag for clusters 1 and 2 is 1, the number flag for clusters 1 and 3 is 1, and the number flag for clusters 2 and 3 is 0. In other embodiments, a different value for the number flag may be used. In some embodiments, a different threshold may be used. For example, the threshold may be twenty percent instead of ten percent, or even another chosen value, different from ten or twenty percent. In another embodiment, the number flag can take on continuous values, e.g., between 0 and 1, reflecting the ratio of number of cluster members between one cluster and another cluster.

TABLE 4

The number flag between a pair of clusters determined using certainty sequential clustering in Table 1.

| Cluster number | Cluster number | Number flag |
|---|---|---|
| 1 | 2 | 1 |
| 1 | 3 | 1 |
| 2 | 3 | 0 |

The distance flags can be set based on the distance between each unique pair of clusters and the sum of the largest eigenvalues of corresponding clusters. In other embodiments, different flags may be used.

The number flags can be set based on the number of members in the respective clusters. In other embodiments, different flags may be used.

After flag computation, analysis of the feature vector can be applied to the desired specific application. For example, the flag computation can be applied to visual field comparisons and temporal change analysis.

Visual Field Comparison and Temporal Change Analysis

For visual field classification purposes, the indices obtained in the methods described above can be taken together to form a feature vector that is characteristic of a particular 3D-CTAG examination result, i.e., a visual field. As a result, visual fields, for example assessed with the Web-based comprehensive visual field test and diagnosis system, can be compared to each other via their respective feature vectors (after proper normalization of the feature vectors), and anomalies can be detected.

The present disclosure comprises the advantage of allowing the comparison of feature vectors after such vectors have been determined following the methods described above, for example comprising the distance flag and number flag indices.

The comparison between visual fields, and the anomaly detection among a set of visual fields, such as a set of visual fields for a particular patient obtained over time, can be performed by an auto-classification system based on the Automated Global Feature Analyzer (AGFA).

The feature vectors in the case of visual field data classification may comprise the relative characterization indices listed above in the present disclosure: relative # of test locations not seen, volume lost relative to hill-of-vision, LAG, ILAG, PAG, IPAG. The reason for the use of the relative characterization indices for the feature vectors as opposed to the absolute ones is that the resulting feature vectors are largely independent from the respective visual field examination specifications, such as the area of visual field tested and contrast levels presented. Otherwise a comparison of different visual fields, taken on different test machines with different examination parameter settings, can become problematic. In other applications, the characterization indices may be different from those listed for visual field comparisons. For example, indices for features for financial markets and other applications have been listed above in the present disclosure.

For the case of visual field comparisons, the feature vectors may enable both qualitative and quantitative analyses of temporal changes of a subject's visual field. These temporal changes can be assessed by calculating the following comparative quantities amongst different 3D-CTAG examination results for each subject:

Overlap Parameter: defined as the N-dimensional scalar product between two feature vectors, ranging from −1 to +1, with −1 representing the case that two visual fields are completely the opposite/dissimilar from each other, 0 representing the case that two visual fields are orthogonal to each other, and with +1 representing the case that two visual fields are the same—and of course all continuous variations in between these values. The Overlap Parameter is a measure of similarity between two feature vectors.

Hamming Distance: defined as the sum of squared differences between the feature vector components, divided by the dimension N of the feature vector. The Hamming Distance is always >=0 and is a measure of similarity between two feature vectors.

Euclidian Distance: defined as the square root of the sum of squared differences between the feature vector components. The Euclidian Distance is always >=0 and is also a measure of similarity between two feature vectors.

Additionally, AGFA can perform sequential clustering among other clustering techniques to group visual field exams of a patient or of several patients into clusters of similarity based on the respective feature vectors, and can subsequently perform anomaly analyses based on inter-cluster comparisons. An anomaly is defined as a particular feature vector, or a component of a particular feature vector (e.g., relative # of test locations not seen, volume lost relative to hill-of-vision, LAG, ILAG, PAG, IPAG), which is significantly different from the other feature vectors, or the same component in the other feature vectors. Together with the Overlap Parameter, Hamming Distance, and Euclidian distance, the clustering and anomaly detection can provide a means for visual field classification and comparison. Moreover, this tool set, provided by AGFA, can allow for the assessment of visual field deterioration or improvement over time (i.e., temporal change) by analyzing the underlying feature vectors that represent the respective visual fields at a given time.

The feature vectors can also serve as inputs to artificial neural networks, such as single- or multi-layered perceptron systems, as well as Hopfield attractor networks for the generation of preliminary diagnoses. In particular, the adaptation of Hopfield attractor networks to the respective visual field area and geometry being tested on a given examination station/device is straightforward because no spatial arrangement assumption of the neurons of the Hopfield attractor network is made with respect to the actual visual field geometry for a given examination station/device.

The objectively derived visual field, scotoma, and metamorphopsia characterization data can:
1. Probabilistically predict ailments via statistical methods and artificial neural networks (see for example, 3D-CTAG-adapted version of visual field classification neural network as described in Fink W., "Neural attractor network for application in visual field data classification", *Phys Med Biol* 49(13):2799-2809, 2004; the disclosure of which is incorporated herein by reference in its entirety).
2. Indicate both qualitatively and quantitatively temporal changes in visual fields of patients over time using classification methods derived from autonomous planetary exploration (see for example, Automated Global Feature Analyzer AGFA, (Fink et al., 2005; Fink et al., 2008); the disclosure of which is incorporated herein by reference in its entirety).

As such the developed comprehensive visual field test and diagnosis system is capable of:
1. Detecting and diagnosing conditions affecting the visual performance early on, allowing for the timely application of therapeutic countermeasures;
2. Monitoring the efficiency and efficacy of therapeutic treatment of the condition over time.

The methods described in the present disclosure may be computer implemented through a hardware device. Such hardware device can comprise a processor and a memory, and a plurality of sensors. The sensors, as understood by the person skilled in the art, can comprise a wide variety of different sensors. For example, camera sensors, radioactivity sensors, magnetic sensors, electrical sensors, chemical sensors, infrared sensors, spectroscopy analyzers, mass spectroscopy sensors, pressure sensors, humidity sensors, blood sugar sensors, temperature sensors, seismic sensors, salinity sensors, velocity sensors and accelerometers, voltmeters, magnetometers, etc.

In some embodiments, the hardware device may be termed a sensing and analyzing device. In some embodiments, the device may be a smartphone or a tablet.

Figure 3:
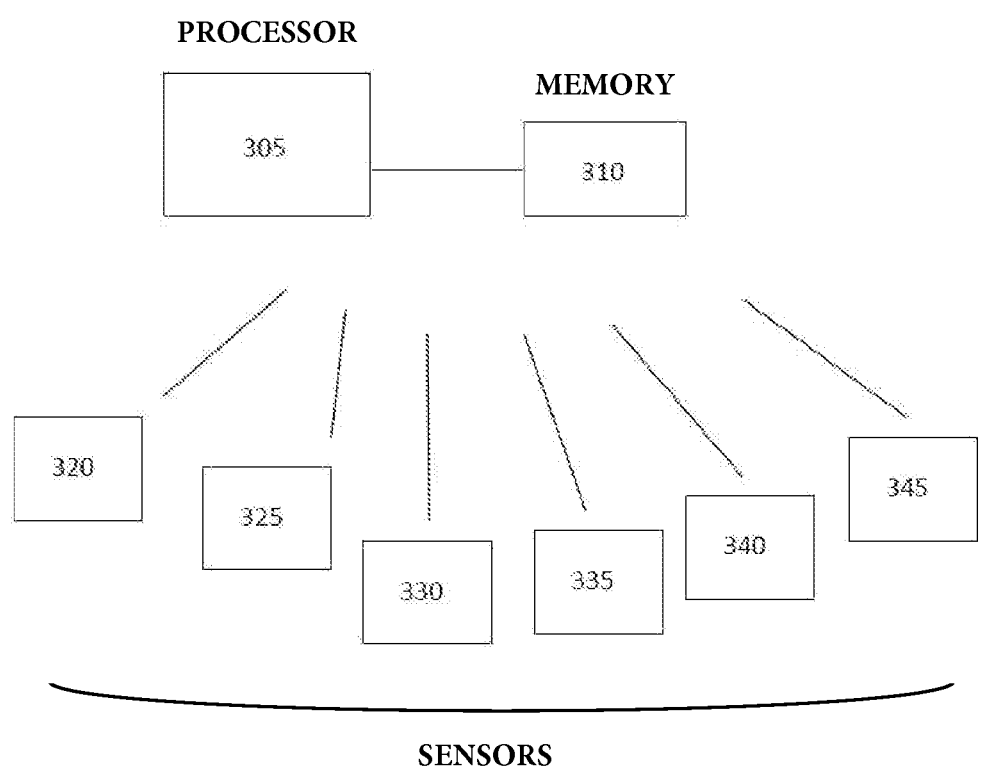
FIG. 3 illustrates an exemplary sensing and analyzing device.

FIG. 3 illustrates an exemplary sensing and analyzing device, comprising a processor (305), a memory (310) and a plurality of sensors (320, 325, 330, 335, 340, 345).

Figure 4:
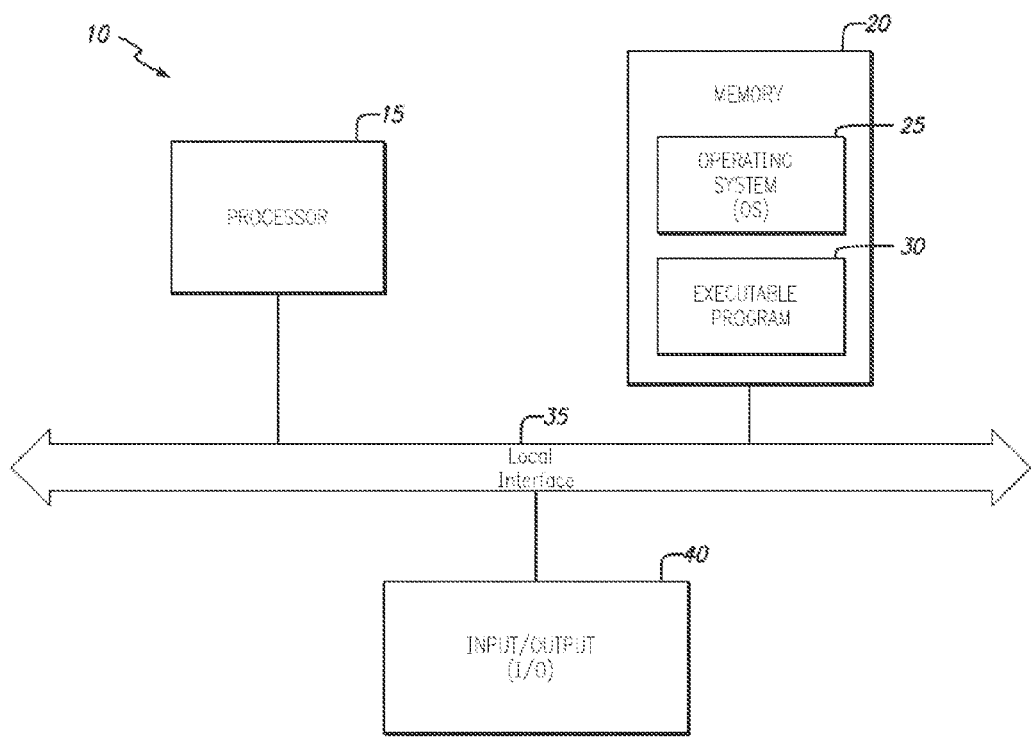
FIG. 4 depicts an exemplary embodiment of a target hardware for implementation of an embodiment of the present disclosure.

FIG. 4 is an exemplary embodiment of a target hardware (10) (e.g., a computer system) for implementing the embodiment of FIGS. 1 and 2. This target hardware comprises a processor (15), a memory bank (20), a local interface bus (35) and one or more Input/Output devices (40). The processor may execute one or more instructions related to the implementation of FIGS. 1 and 2, and as provided by the Operating System (25) based on some executable program (30) stored in the memory (20). These instructions are carried to the processor (15) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, inputting data and/or commands from a touchscreen, outputting data to a display, or outputting data to a USB flash drive. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 4. In some embodiments a plurality of processors may be used in a parallel configuration for added execution speed. In such a case, the executable program may be specifically tailored to a parallel execution. Also, in some embodiments the processor (15) may execute part of the implementation of FIGS. 1 and 2, and some other part may be implemented using dedicated hardware/firmware placed at an Input/Output location accessible by the target hardware (10) via local interface (35). The target hardware (10) may include a plurality of executable programs (30), wherein each may run independently or in combination with one another.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general purpose GPU).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an" and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A computer implemented method comprising:
providing a sensing and analyzing device, the sensing and analyzing device comprising at least one sensor configured to detect at least one physical feature describing a plurality of physical objects;
generating, by the sensing and analyzing device, a plurality of feature vectors representing the plurality of objects, based on the at least one physical feature, wherein the plurality of feature vectors comprises a plurality of components describing the at least one physical feature, wherein each component of the plurality of components has a numerical range, wherein the at least one physical feature is represented by at least one component within each feature vector;
converting, by the sensing and analyzing device, the numerical range of each component to a range between 0 and 1, wherein the converting is carried out by formula $$F1_{ij} = \frac{OrigF_{ij} - MinF_j}{MaxF_j - MinF_j}$$

where $F1_{ij}$ is a normalized value of $i^{th}$ object and $j^{th}$ feature component, $OrigF_{ij}$ is an original $j^{th}$ feature component value of $i^{th}$ object, $MinF_j$ and $MaxF_j$ are a minimum value and a maximum value of $j^{th}$ feature component, thereby obtaining a first plurality of normalized feature vectors comprising a first plurality of normalized components and further comprising a total number of components for the at least one physical feature of each first normalized feature vector of the first plurality of normalized feature vectors;

for each first normalized feature vector of the first plurality of feature vectors, dividing, by the sensing and analyzing device, the plurality of normalized components for each physical feature of each first normalized feature vector by the total number of components for each physical feature of the first normalized feature vector, thereby obtaining a second plurality of normalized feature vectors;

normalizing, by the sensing and analyzing device, the second plurality of normalized feature vectors by formula $$F3_{ij} = \frac{F2_{ij}}{\sqrt{\sum_{j=1}^{N} (F2_{ij})^2}}$$

where $F2_{ij}$ is a component of a feature vector of the second plurality of normalized feature vectors, and $F3_{ij}$ is a resultant component for each feature vector of a third plurality of normalized feature vectors;

clustering, by the sensing and analyzing device, the third plurality of normalized feature vectors, thereby obtaining a plurality of clustered normalized feature vectors;

analyzing, by the sensing and analyzing device, the plurality of physical objects, based on at least one of the first, second, or third plurality of normalized feature vectors.

2. The computer implemented method of claim 1, wherein the clustering comprises:
defining, by the sensing and analyzing device, a first parameter $t_1$ and a second parameter $t_2$, wherein the second parameter is greater than the first parameter;
calculating, by the sensing and analyzing device, a cluster center $C_j$ for a cluster $c_j$, wherein j is a first counting parameter;
calculating, by the sensing and analyzing device, a distance $d(F3_i, C_j)$ between
each feature vector of the third plurality of normalized feature vectors and the cluster
center $C_j$, wherein each feature vector is termed $F3_i$, and wherein i is a second counting parameter;
assigning, by the sensing and analyzing device, each feature vector $F3_i$ of the third plurality of normalized feature vectors to the cluster $c_j$, based on the first parameter $t_1$ and the second parameter $t_2$, wherein the assigning comprises iterating steps a)-c):
a) if the distance $d(F3_i, C_j)$ is smaller than the first parameter $t_1$, the feature vector $F3_i$ is assigned to the cluster $c_j$ with the cluster center $C_j$;
b) if the distance $d(F3_i, C_j)$ is greater than the second parameter $t_2$, the feature vector $F3_i$ is not assigned to the cluster $c_j$ with the cluster center $C_j$, j is incremented and the feature vector $F3_i$ is assigned to the cluster $c_j$ with the cluster center $C_j$;
c) if the distance $d(F3_i, C_j)$ is greater than the first parameter $t_1$ but smaller than the second parameter $t_2$, the assigning is postponed;
wherein the iterating is stopped once a desired condition is reached and each feature vector $F3_i$ is clustered, thereby obtaining a plurality of clustered normalized feature vectors.

3. The computer implemented method of claim 1, wherein the clustering is by sequential clustering, K-means clustering, certainty sequential clustering or level-set-analysis clustering.

4. The computer implemented method of claim 1, wherein the at least one physical feature is chosen from the group comprising: color; albedo; shape; extent; angularity; compactness; size; texture; multi-spectral data; hyperspectral data; spectroscopic data; biological contaminate concentrations; chemical contaminate concentrations; radioactive contamination.

5. The computer implemented method of claim 1, wherein the analyzing is for region-of-interest demarcation or delineation; anomaly detection; autonomous vehicle control; or guidance for exploration equipment.

6. The computer implemented method of claim 1, wherein the analyzing is for geology, mining, resource allocation, or reconnaissance.

7. The computer implemented method of claim 1, wherein the analyzing is for medical diagnosis and the plurality of physical features comprises: patient-specific data; blood examination results; urine or stool examination results; x-ray, CT, MM, fMRI, or ultrasound images; multi-spectral data; hyperspectral data; pulse; heart rate; intraocular pressure; intracranial pressure; blood pressure; lung volume.

8. The computer implemented method of claim 1, wherein the analyzing is for financial markets and the plurality of physical features comprises electric signals sensed on a data wire, wherein the electrical signals describe data comprising: stock values; opening bid; closing bid; bids throughout trading period; gold price; stock indices; trading volume.

9. The computer implemented method of claim 1, wherein the analyzing is for visual fields and the at least one physical feature is chosen from the group comprising: scotoma center, slope distribution, relative number of test locations not seen, relative area of visual field impaired, relative hill-of-vision volume lost, scotoma perimeter, scallopedness, absolute number of test-locations not seen, area of visual field impaired, absolute hill-of-vision volume lost, lost area grade, preserved area grade, inverse lost area grade, inverse preserved area grade.

10. The computer implemented method of claim 1, wherein $MinF_j$ and $MaxF_j$ are user-defined.

11. The computer implemented method of claim 2, wherein the distance is a Euclidean distance.

12. The computer implemented method of claim 1, further comprising analyzing, by the sensing and analyzing device, the plurality of physical objects, based on temporal changes.

13. The computer implemented method of claim 12, further comprising calculating an overlap parameter, a Hamming distance, a Euclidian distance or a distance calculation based on a threshold value, and wherein the analyzing, by the sensing and analyzing device, the plurality of physical objects, based on temporal changes is based on the overlap parameter, the Hamming distance, the Euclidian distance or the distance based on the threshold.

14. The computer implemented method of claim 1, further comprising inputting at least one of the first, second, or third plurality of normalized feature vectors to an artificial neural network.

15. The computer implemented method of claim 14, wherein the artificial neural network is a single- or multi-layered perceptron system.

16. The computer implemented method of claim 14, wherein the artificial neural network is a Hopfield attractor network.

17. The computer implemented method of claim 14, further comprising generating a preliminary diagnoses based on an output of the artificial neutral network.

18. A computer implemented method comprising:
providing a sensing and analyzing device, the sensing and analyzing device comprising at least one sensor configured to detect at least one physical feature describing a plurality of physical objects;
generating, by the sensing and analyzing device, a plurality of feature vectors representing the plurality of objects, based on the at least one physical feature, wherein the plurality of feature vectors comprises a plurality of components describing the at least one physical feature, wherein each component of the plurality of components has a numerical range, wherein each physical feature of the at least one physical feature is represented by at least one component within each feature vector;
converting, by the sensing and analyzing device, the numerical range of each component to a range between 0 and 1, wherein the converting is carried out by formula $$F1_{ij} = \frac{OrigF_{ij} - MinF_j}{MaxF_j - MinF_j}$$

where $F1_{ij}$ is a normalized value of $i^{th}$ object and $j^{th}$ component, $OrigF_{ij}$ is an original $j^{th}$ feature component value of $i^{th}$ object, $MinF_j$ and $MaxF_j$ are a minimum value and a maximum value of $j^{th}$ feature component, thereby obtaining a first plurality of normalized feature vectors comprising a first plurality of normalized components and further comprising a total number of components for the at least one physical feature of each first normalized feature vector of the first plurality of normalized feature vectors;
for each first normalized feature vector of the first plurality of feature vectors, dividing, by the sensing and analyzing device, the plurality of normalized components for the at least one physical feature of each first normalized feature vector by the total number of components for each physical feature of the first normalized feature vector, thereby obtaining a second plurality of normalized feature vectors;
normalizing, by the sensing and analyzing device, the second plurality of normalized feature vectors by formula $$F3_{ij} = \frac{F2_{ij}}{\sqrt{\sum_{j=1}^{N}(F2_{ij})^2}}$$

where $F2_{ij}$ is a component of a feature vector of the second plurality of normalized feature vectors, and $F3_{ij}$ is a resultant component for each feature vector of a third plurality of normalized feature vectors;
clustering, by the sensing and analyzing device, the third plurality of normalized feature vectors, thereby obtaining a plurality of clustered normalized feature vectors;
applying, by the sensing and analyzing device, principal component analysis to the plurality of clustered normalized feature vectors, thereby obtaining a distance flag value and a first evaluated plurality of normalized feature vectors;

calculating, by the sensing and analyzing device, a number flag value by counting each feature vector of the plurality of clustered normalized feature vectors, based on a threshold value, thereby obtaining a second evaluated plurality of normalized feature vectors;

analyzing, by the sensing and analyzing device, the plurality of physical objects, based on the first or second evaluated plurality of normalized feature vectors.

19. The computer implemented method of claim 18, wherein the clustering comprises:

defining, by the sensing and analyzing device, a first parameter $t_1$ and a second parameter $t_2$, wherein the second parameter is greater than the first parameter;

calculating, by the sensing and analyzing device, a cluster center $C_j$ for a cluster $c_j$, wherein j is a first counting parameter;

calculating, by the sensing and analyzing device, a distance $d(F3_i, C_j)$ between each feature vector of the third plurality of normalized feature vectors and the cluster center $C_j$, wherein each feature vector is termed $F3_i$, and wherein i is a second counting parameter;

assigning, by the sensing and analyzing device, each feature vector $F3_i$ of the third plurality of normalized feature vectors to the cluster $c_j$, based on the first parameter $t_1$ and the second parameter $t_2$, wherein the assigning comprises iterating steps a)-c):

d) if the distance $d(F3_i, C_j)$ is smaller than the first parameter $t_1$, the feature vector $F3_i$ is assigned to the cluster $c_j$ with the cluster center $C_j$;

e) if the distance $d(F3_i, C_j)$ is greater than the second parameter $t_2$, the feature vector $F3_i$ is not assigned to the cluster $c_j$ with the cluster center $C_j$, j is incremented and the feature vector $F3_i$ is assigned to the cluster $c_j$ with the cluster center $C_j$;

f) if the distance $d(F3_i, C_j)$ is greater than the first parameter $t_1$ but smaller than the second parameter $t_2$, the assigning is postponed;

wherein the iterating is stopped once a desired condition is reached and each feature vector $F3_i$ is clustered, thereby obtaining a plurality of clustered normalized feature vectors.

20. The computer implemented method of claim 18, wherein the clustering is by sequential clustering, K-means clustering, certainty sequential clustering or level-set-analysis clustering.

21. The computer implemented method of claim 18, wherein the at least one physical feature is chosen from the group comprising: color; albedo; shape; extent; angularity; compactness; size; texture; multi-spectral data; hyperspectral data; spectroscopic data; biological contaminate concentrations; chemical contaminate concentrations; radioactive contamination.

22. The computer implemented method of claim 18, wherein the analyzing is for region-of-interest demarcation or delineation; anomaly detection; autonomous vehicle control; or guidance for exploration equipment.

23. The computer implemented method of claim 18, wherein the analyzing is for geology, mining, resource allocation, or reconnaissance.

24. The computer implemented method of claim 18, wherein the analyzing is for medical diagnosis and the at least one physical feature is chosen from the group comprising: patient-specific data; blood examination results; urine or stool examination results; x-ray, CT, MRI, fMRI, or ultrasound images; multi-spectral data; hyperspectral data; pulse; heart rate; intraocular pressure; intracranial pressure; blood pressure; lung volume.

25. The computer implemented method of claim 18, wherein the analyzing is for financial markets and the at least one physical feature is chosen from the group comprising: electric signals sensed on a data wire, wherein the electrical signals describe data comprising: stock values; opening bid; closing bid; bids throughout trading period; gold price; stock indices; trading volume.

26. The computer implemented method of claim 18, wherein the analyzing is for visual fields and the at least one physical feature is chosen from the group comprising: scotoma center, slope distribution, relative number of test locations not seen, relative area of visual field impaired, relative hill-of-vision volume lost, scotoma perimeter, scallopedness, absolute number of test-locations not seen, area of visual field impaired, absolute hill-of-vision volume lost, lost area grade, preserved area grade, inverse lost area grade, inverse preserved area grade.

27. The computer implemented method of claim 18, wherein $MinF_j$ and $MaxF_j$ are user-defined.

28. The computer implemented method of claim 19, wherein the distance is a Euclidean distance.

29. The computer implemented method of claim 18, further comprising analyzing, by the sensing and analyzing device, the plurality of physical objects, based on temporal changes.

30. The computer implemented method of claim 29, further comprising calculating an overlap parameter, a Hamming distance, a Euclidian distance or a distance calculation based on a threshold value, and wherein the analyzing, by the sensing and analyzing device, the plurality of physical objects, based on temporal changes is based on the overlap parameter, the Hamming distance, the Euclidian distance or the distance based on the threshold.

31. The computer implemented method of claim 18, further comprising inputting at least one of the first, second, or third plurality of normalized feature vectors to an artificial neural network.

32. The computer implemented method of claim 31, wherein the artificial neural network is a single- or multi-layered perceptron system.

33. The computer implemented method of claim 31, wherein the artificial neural network is a Hopfield attractor network.

34. The computer implemented method of claim 31, further comprising generating a preliminary diagnoses based on an output of the artificial neutral network.

* * * * *